July 8, 1930.  A. JOHNSON  1,770,036
LUBRICATING DEVICE
Filed April 12, 1928

WITNESSES

INVENTOR
Albert Johnson
BY
ATTORNEY

UNITED STATES PATENT OFFICE

ALBERT JOHNSON, OF NEW YORK, N. Y.

LUBRICATING DEVICE

Application filed April 12, 1928. Serial No. 269,450.

This invention relates to lubricating devices, and comprehends an improved lubricator which insures a uniform feed of the lubricant to the part or parts to be lubricated.

The invention furthermore contemplates a lubricator including means for rendering the uniform feed adjustable or capable of regulation.

More specifically, the invention comprehends a lubricating device which includes a lubricant well from which a capillary feeding element immersed in the lubricant, leads to the parts to be lubricated and in which a lubricant reservoir is employed, the same being provided with an outlet submerged in the lubricant for maintaining a constant level in the well whereby uniform feed of the lubricant is obtained.

The invention furthermore resides in means for adjusting the outlet with respect to the well for regulating the level of the lubricant in the well in order to increase and decrease the flow of lubricant through the capillary element.

Other objects of the invention reside in the comparative simplicity of construction and mode of use of the device, the economy with which it may be produced and installed and the general efficiency derived therefrom.

With the above recited and other objects in view, reference is had to the following description and accompanying drawings, in which there is exhibited one example or embodiment of the invention, while the claim defines the actual scope of the same.

Figure 1:
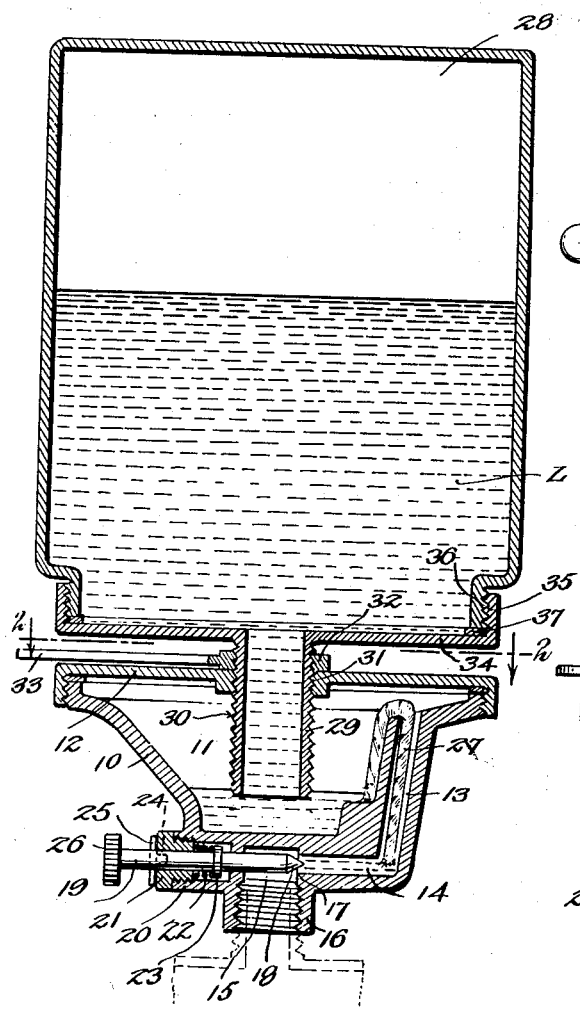
Figure 1 is a vertical sectional view through the lubricating device.
Figure 2:
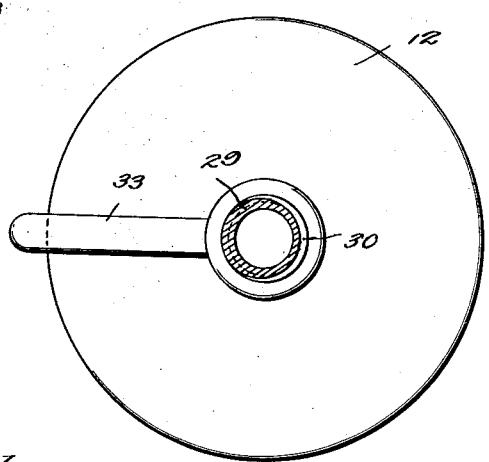
Figure 2 is a sectional plan view thereof taken approximately on the line 2—2 of Figure 1.

Referring to the drawings by characters of reference, 10 designates a base member which is of substantially cup-shaped formation and which defines a lubricant well 11 within its confines. The base 10 is preferably closed at its upper open end by a cover 12 which is threadedly associated therewith. The base is further provided with a conduit or passage having a vertical portion 13 communicating with the well 11 adjacent the upper end and above the maximum level of the lubricant to be received by the well. The conduit is provided at its lower end with a communicating horizontal portion 14 which leads into a chamber 15 having a depending boss 16 for attachment to the part to be lubricated. At the juncture of the conduit portion 14 with the chamber, a valve seat 17 is provided with which a valve element 18 is adapted to cooperate for cutting off the flow of lubricant from the conduit to the chamber 15. The valve element 18 is provided with a stem 19 projecting laterally through a boss 20. The boss 20 is provided with a removable plug 21 constituting a bearing element for the stem 19 and as a seat for one end of a coiled expansion spring 22, the opposite end of which engages an abutment or enlargement 23 on the stem to move the stem in a direction to effect engagement of the valve element 18 with the seat 17. The plug 21 is formed with radial grooves 24 while the stem is provided with a transverse pin 25. When the stem is rotated to a position where the projecting terminals of the pin register or align with the grooves 24, the spring functions to axially project the valve stem in a direction to engage the valve element 18 with the seat 17. The valve stem is provided at its outer free end with a manipulating head 26 which affords means for exerting an outward pull on the stem and for turning the same to a position where the protruding portions of the pin 25 are out of alignment or registry with the grooves, thereby holding the valve stem in a position to unseat the valve element 18 from the seat 17, against the action of the spring 22.

A capillary element such as a wick 27 extends upwardly through the vertical portion 13 of the conduit and into the well 11 with its end immersed in the lubricant contained therein. A reservoir consisting of a container 28 holding a supply of lubricant L is designed to gravitationally feed lubricant to the well 11 in such a manner that a predetermined level of the lubricant is maintained in the well. The container 28 is preferably in the nature of an inverted jar or vessel having an outlet neck 29 which depends therefrom and is submerged in the lubricant contained in the well. It is obvious that by maintaining a constant level in the well the capillary element or wick 27 will feed a uniform quantity of lubricant through the conduit to the chamber 15 and thence through the boss to the parts to be lubricated.

In view of the fact that it is desirable to regulate or govern the feed, suitable means is accorded for varying the level of the lubricant in the well. Obviously, this may be accomplished in various ways, but for the purposes of illustration of one manner in which it may be accomplished, the outlet neck 29 of the reservoir is shown as provided with external threads 30 which engage within the threaded opening 31 of the cover 12 of the well and a lock nut 32 is threadedly engaged on the neck for retaining the neck in its vertically adjusted positions. In order to facilitate manipulation of the nut, the same is provided with a radially projecting handle 33 which extends outwardly a sufficient distance beyond the cover to allow for grasping and manipulation thereof. The outlet neck 29 as illustrated is formed as a part of a removable closure cap 34 having an internally threaded flange 35 which engages over the threaded portion 36 of the container 28 and which is suitably sealed in place by means of a gasket 37.

Figure 3:
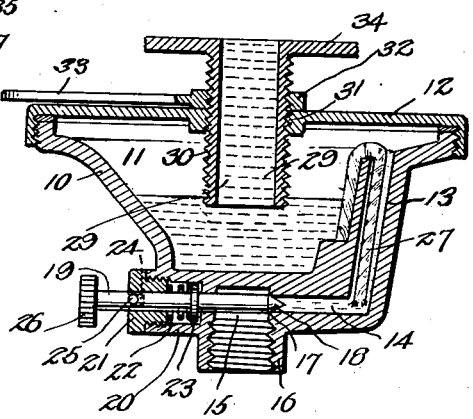
Figure 3 is a fragmentary vertical sectional view illustrating the device adjusted to increase the flow of lubricant.

In use and operation, the flow of feed of lubricant through the wick or capillary element 27 is decreased by lowering the level of the lubricant in the well 11 and is increased by raising the level as illustrated in Figure 3 of the drawings. It will thus be seen that an adjustable uniform feed for lubricators has been devised which insures when adjusted a positive uniform feed of lubricant to a part to be lubricated.

What is claimed is:

A lubricating device including a base defining a lubricant well having a downwardly directed conduit opening at its upper end into the well above the maximum level of the lubricant contained therein, a capillary feeding element extending through the conduit and immersed in the lubricant in the well and a closed lubricant reservoir having a depending exteriorly threaded outlet nozzle threadedly engaged with the base to dispose its outlet end in the well, said reservoir being vertically adjustable by turning movement thereof with respect to the base to raise and lower the level of the lubricant in the well whereby to increase and decrease the feed of the lubricant by the capillary element and a lock nut threadedly engaging the outlet nozzle for impinging against the threaded portion of the base to retain the reservoir in its vertically adjusted positions.

Signed at New York city, in the county of New York, and State of New York, this 11th day of April, 1928.

ALBERT JOHNSON.